US012754394B2

(12) United States Patent
Moon et al.

(10) Patent No.: US 12,754,394 B2
(45) Date of Patent: Oct. 6, 2026

(54) OPTICAL SYSTEM

(71) Applicant: LG INNOTEK CO., LTD., Seoul (KR)

(72) Inventors: Sung Min Moon, Seoul (KR); Young Man Kwon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 626 days.

(21) Appl. No.: 18/020,574

(22) PCT Filed: Aug. 6, 2021

(86) PCT No.: PCT/KR2021/010375
§ 371 (c)(1),
(2) Date: Feb. 9, 2023

(87) PCT Pub. No.: WO2022/035134
PCT Pub. Date: Feb. 17, 2022

(65) Prior Publication Data

US 2023/0314765 A1 Oct. 5, 2023

(30) Foreign Application Priority Data

Aug. 10, 2020 (KR) ........................ 10-2020-0099957

(51) Int. Cl.
*G02B 9/60* (2006.01)
*G02B 13/00* (2006.01)
*G02B 15/14* (2006.01)

(52) U.S. Cl.
CPC ........... *G02B 9/60* (2013.01); *G02B 13/0045* (2013.01); *G02B 15/145127* (2019.08)

(58) Field of Classification Search
CPC .................. G02B 9/60; G02B 13/0045; G02B 15/145127
See application file for complete search history.

(56) References Cited

U.S. PATENT DOCUMENTS

| | | | | |
|---|---|---|---|---|
| 9,606,333 | B2 | 3/2017 | Furuya | |
| 9,715,088 | B1 | 7/2017 | Yang | |
| 2014/0029117 | A1* | 1/2014 | Noda | G02B 13/0045 359/714 |
| 2014/0104707 | A1* | 4/2014 | Nakamura | G02B 13/004 359/738 |
| 2016/0018629 | A1* | 1/2016 | Tang | G02B 13/0045 359/713 |

(Continued)

FOREIGN PATENT DOCUMENTS

| | | | |
|---|---|---|---|
| CN | 103477264 | A | 12/2013 |
| CN | 106802465 | A | 6/2017 |

(Continued)

*Primary Examiner* — Jia X Pan
(74) *Attorney, Agent, or Firm* — Birch, Stewart, Kolasch & Birch, LLP

(57) ABSTRACT

The optical system disclosed in the embodiment includes first to fifth lenses sequentially disposed along an optical axis from an object side to an image side, each of the first to fifth lenses including an object-side surface and an image-side surface, a size of the effective aperture of the image-side surface of the first lens may be greater than the size of the effective aperture of the object-side surface of the first lens, and the thickness of the first lens may be smaller than the thickness of the second lens.

16 Claims, 7 Drawing Sheets

(56) References Cited

U.S. PATENT DOCUMENTS

| | | | |
|---|---|---|---|
| 2017/0153424 A1 | 6/2017 | Kim | |
| 2017/0322391 A1 | 11/2017 | Kang et al. | |
| 2017/0336604 A1* | 11/2017 | Hsu .................... | G02B 13/0045 |
| 2019/0285858 A1 | 9/2019 | Hsu et al. | |
| 2019/0369369 A1 | 12/2019 | Shabtay et al. | |
| 2020/0201004 A1 | 6/2020 | Kim | |
| 2022/0382021 A1 | 12/2022 | Kim | |
| 2024/0151945 A1 | 5/2024 | Kim | |
| 2025/0155683 A1 | 5/2025 | Kim | |

FOREIGN PATENT DOCUMENTS

| | | | | |
|---|---|---|---|---|
| CN | 107024759 | A | | 8/2017 |
| CN | 110927955 | A | | 3/2020 |
| CN | 210323548 | U | | 4/2020 |
| JP | 2009151046 | A | * | 7/2009 |
| JP | 2011175198 | A | * | 9/2011 |
| JP | 2013-246217 | A | | 12/2013 |
| JP | 2015-72404 | A | | 4/2015 |
| JP | 2016-148735 | A | | 8/2016 |
| KR | 10-2009-0114119 | A | | 11/2009 |
| KR | 10-0965755 | B1 | | 6/2010 |
| KR | 10-1123776 | B1 | | 3/2012 |
| KR | 10-2017-0125654 | A | | 11/2017 |
| KR | 10-1834729 | B1 | | 3/2018 |
| WO | WO 2012/132456 | A1 | | 10/2012 |
| WO | WO 2012/176791 | A1 | | 12/2012 |

* cited by examiner

OPTICAL SYSTEM

CROSS REFERENCE TO RELATED APPLICATIONS

This application is the National Phase of PCT International Application No. PCT/KR2021/010375, filed on Aug. 6, 2021, which claims priority under 35 U.S.C. 119(a) to Patent Application No. 10-2020-0099957, filed in the Republic of Korea on Aug. 10, 2020, all of which are hereby expressly incorporated by reference into the present application.

TECHNICAL FIELD

Embodiments are directed to optics for improved optical performance.

BACKGROUND ART

The camera module captures an object and stores it as an image or video, and is installed in various applications. In particular, the camera module is produced in a very small size and is applied to not only portable devices such as smartphones, tablet PCs, and laptops, but also drones and vehicles to provide various functions. For example, the optical system of the camera module may include an imaging lens for forming an image, and an image sensor for converting the formed image into an electrical signal. In this case, the camera module may perform an autofocus (AF) function of aligning the focal lengths of the lenses by automatically adjusting the distance between the image sensor and the imaging lens, and may perform a zooning function of zooming up or zooning out by increasing or decreasing the magnification of a remote object through a zoom lens. In addition, the camera module employs an image stabilization (IS) technology to correct or prevent image stabilization due to an unstable fixing device or a camera movement caused by a user's movement. The most important element for this camera module to obtain an image is an imaging lens that forms an image. Recently, interest in high efficiency such as high image quality and high resolution is increasing, and research on an optical system including plurality of lenses is being conducted in order to realize this. For example, research using a plurality of imaging lenses having positive (+) and/or negative (−) refractive power to implement a high-efficiency optical system is being conducted. However, when a plurality of lenses is included, there is a problem in that it is difficult to derive excellent optical properties and aberration properties.

In general, an optical system including a plurality of lenses may have a set effective focal length (EFL). In this case, when the effective focal length (EFL) value is relatively large, a lens closest to the object side has a large aperture or has the largest aperture among a plurality of lenses. Accordingly, since the lens closest to the object side has a relatively large size, it is difficult to miniaturize the optical system. An optical system including a plurality of lenses may have a relatively high height. For example, as the number of lenses increases, the distance from the image sensor to the object surface of the lens closest to the object may increase. Accordingly, the overall thickness of the device such as a smart phone in which the optical system is disposed may increase, and there is a problem in that it is difficult to miniaturize the device. Therefore, a new optical system capable of solving the above problems is required.

DISCLOSURE

Technical Problem

Embodiments provides an optical system with improved optical properties. Embodiments provides an optical system that can be implemented in a small and compact manner. Embodiments provides an optical system applicable to a folded camera having a thin thickness.

Technical Solution

An optical system according to an embodiment includes first to fifth lenses sequentially arranged along an optical axis from an object side to an image side, wherein each of the first to fifth lenses includes an object-side surface and an image-side surface, wherein a size of an effective aperture of the image-side surface of the first lens may be greater than a size of an effective aperture of the object-side surface of the first lens, and a thickness of the first lens may be smaller than the thickness of the second lens.

According to an embodiment of the invention, the first lens may have a positive (+) refractive power, and an object-side surface of the first lens may have a negative (−) radius of curvature. A thickness of the first lens may be thinner than a thickness of the third lens and thicker than a thickness of the fourth lens or the fifth lens. A thickness of the first lens may be smaller than a distance between the first lens and the second lens. A thickness of the second lens may be greater than that of the first lens, the third lens, the fourth lens, and the fifth lens.

An optical system according to an embodiment includes first to fifth lenses sequentially disposed along an optical axis from an object side to an image side, wherein the first lenses have positive (+) refractive power and have a concave shape with respect to the optical axis. The second lens may have a surface having a larger effective aperture than the size of the effective aperture of the object-side surface of the first lens.

The second lens may have a positive (+) refractive power, and a focal length of the first lens may be greater than a focal length of the second lens. Also, the effective focal length EFL of the optical system may be smaller than the focal length of the first lens and larger than the focal length of the second lens. An image-side surface of the first lens may have a convex shape, and an image-side surface of the second lens may have a concave shape.

The optical system according to the embodiment includes first to fifth lenses sequentially disposed along an optical axis from an object side to an image side, and a thickness of the first lens is thinner than thicknesses of the second lens and the third lens and thicker than thicknesses of the fourth lens and the fifth lens, the thickness of the second lens is thicker than the thickness of the third lens, wherein an object-side surface or an image-side surfaced of one lens selected from the first lens and the second lens may have the largest effective aperture among the object-side surface and the image-side surface of the first to fifth lenses.

Advantageous Effects

The optical system according to the embodiment may have improved optical characteristics. In detail, the optical system may include a plurality of lenses and may include at least one lens surface having an effective aperture greater than an object-side surface of a first lens closest to the object.

Accordingly, when designing an optical system including the plurality of lenses, improved optical characteristics may be obtained.

The optical system according to the embodiment may be provided slim. For example, in the optical system, a lens having a relatively large effective dimeter, for example, at least one lens adjacent to an object side may have a D-cut shape. Accordingly, it is possible to minimize the loss of light during the process of incident light and to have a slimmer shape.

The optical system according to the embodiment may include, for example, the optical system may change light incident in a direction perpendicular to the surface of the device or apparatus including the light path changing member into a direction parallel to the surface of the device or the apparatus. Accordingly, the optical system including the plurality of lenses may have a smaller thickness within the device or apparatus, and the overall thickness of the device or apparatus may be reduced.

BEST MODE

Figure 1:
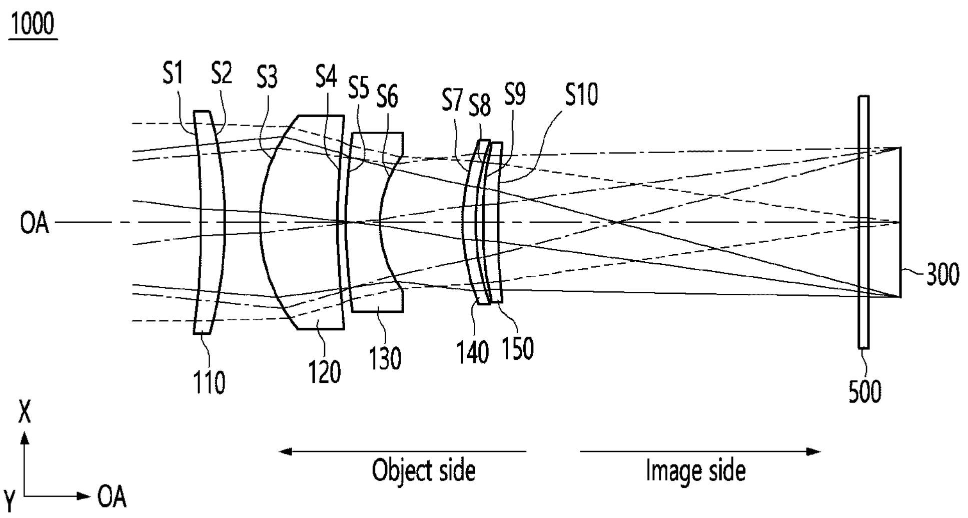
FIG. 1 is a view showing a side cross-section of an optical system in a first direction X according to a first embodiment.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

The convex surface of the lens may mean that the lens surface of the region corresponding to the optical axis has a convex shape, and the concave lens surface means that the lens surface of the region corresponding to the optical axis has a concave shape. In addition, "object-side surface" may mean the surface of the lens facing the object side with respect to the optical axis, and "image-side surface" may mean the surface of the lens toward the imaging surface with respect to the optical axis. In addition, the vertical direction may mean a direction perpendicular to the optical axis, and the end of the lens or the lens surface may mean the end of the effective region of the lens through which the incident light passes. The center thickness of the lens may refer to a thickness of an area overlapping the optical axis in the optical axis direction of the lens.

The optical system 1000 according to an embodiment of the invention may include a plurality of lenses sequentially arranged from the object side to the image side. The optical system 1000 may include a filter 500 and an image sensor 300 on the image side of the plurality of lenses. The plurality of lenses may include four or more lenses. In detail, the plurality of lenses may include five or more lenses. They may be sequentially arranged along the optical axis OA of the optical system 1000. Light corresponding to image information of an object may pass through the plurality of lenses and the filter 500 sequentially and be incident to the image sensor 300.

Each of the plurality of lenses may include an effective region and an ineffective region. The effective region may be a region through which light incident on the lens passes. That is, the effective region may be a region in which the incident light is refracted to implement optical characteristics. The ineffective region may be arranged around the effective region. The ineffective region may be a region in which the light is not incident. That is, the ineffective region may be a region unrelated to the optical characteristics. Also, the ineffective region may be a region fixed to a barrel (not shown) accommodating the lenses. The optical system 1000 according to the embodiment may include an aperture stop for adjusting the amount of incident light. The aperture stop may be disposed between two lenses selected from among the plurality of lenses. At least one lens among the plurality of lenses may serve as an aperture stop. For example, a lens surface of one lens selected from among the plurality of lenses may serve as an aperture stop for adjusting the amount of light incident to the optical system 1000.

The filter 500 may be disposed between the plurality of lenses and the image sensor 300. The filter 500 may include at least one of an infrared filter and an optical filter such as a cover glass. The filter 500 may pass light of a set wavelength band and filter light of a different wavelength band. When the filter 500 includes an infrared filter, radiant heat emitted from external light may be blocked from being transferred to the image sensor 300. In addition, the filter 500 may transmit visible light and reflect infrared light. The image sensor 300 may detect light. In detail, the image sensor 300 may detect light sequentially passing through the first to fifth lenses 110, 120, 130, 140, and 150. The image sensor 300 may include a Charge Coupled Device (CCD) or Complementary Metal Oxide Semiconductor (CMOS).

The optical system 1000 may further include a light path changing member (not shown). The light path changing member may change a path of light by reflecting light incident from the outside. The light path changing member may include a reflector or a prism. For example, the light path changing member may include a right-angle prism. When the light path changing member includes a right-angle prism, the light path changing member may change the path of light by reflecting the path of incident light at an angle of 90 degrees. The light path changing member may be disposed closer to the object side than the plurality of lenses. That is, the optical system 1000 may include an optical path changing member, the plurality of lenses, the filter 500, and the image sensor 300 sequentially disposed along the optical axis OA from the object side toward the image side. The light path changing member may change a path of light in a set direction by reflecting light incident from the outside. That is, the light path changing member may change a path of light incident to the light path changing member toward the plurality of lenses. Accordingly, the optical system 1000 according to the embodiment may be applied to a folded camera capable of reducing the thickness of the camera. In detail, the optical system 1000 may include the light path changing member and change light incident in a direction perpendicular to the surface of the device applied thereto into a direction parallel to the surface of the device. Accordingly, the optical system 1000 including a plurality of lenses may have a thinner thickness within the device, and thus the device may be provided thinner.

In more detail, when the optical system 1000 does not include the light path changing member, the plurality of lenses may be arranged extending in a direction perpendicular to the surface of the device in the device. Accordingly, the optical system 1000 including the plurality of lenses may have a high height in a direction perpendicular to the surface of the device. However, when the optical system 1000 is applied to a folded camera including the light path changing member, the plurality of lenses may be arranged to extend in a direction parallel to the surface of the device. Accordingly, the optical system 1000 including the plurality of lenses may have a low height in a direction perpendicular to the surface of the device. Accordingly, the folded camera including the optical system 1000 may have a thin thickness within the device, and the thickness of the device may also be reduced.

First Embodiment

Figure 2:
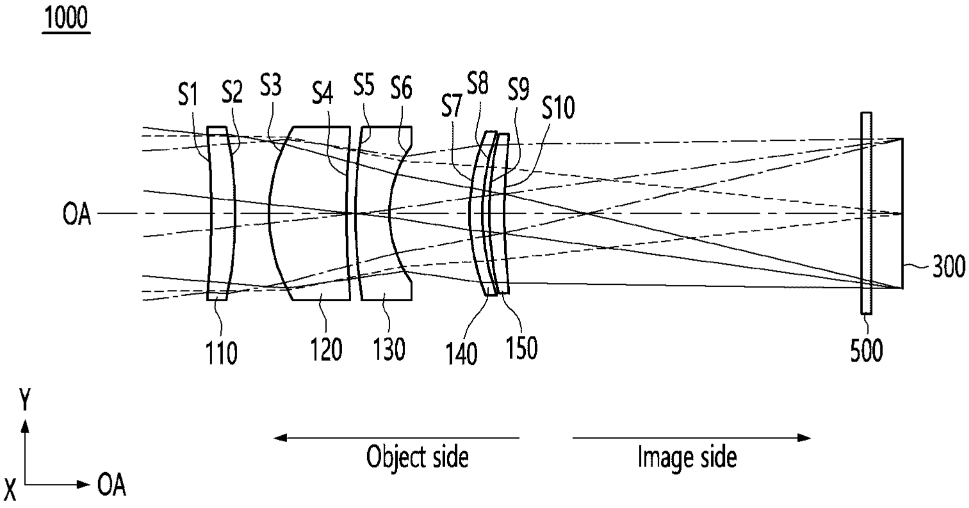
FIG. 2 is a view showing a side cross-section of the optical system in the second direction Y according to the first embodiment.
Figure 3:
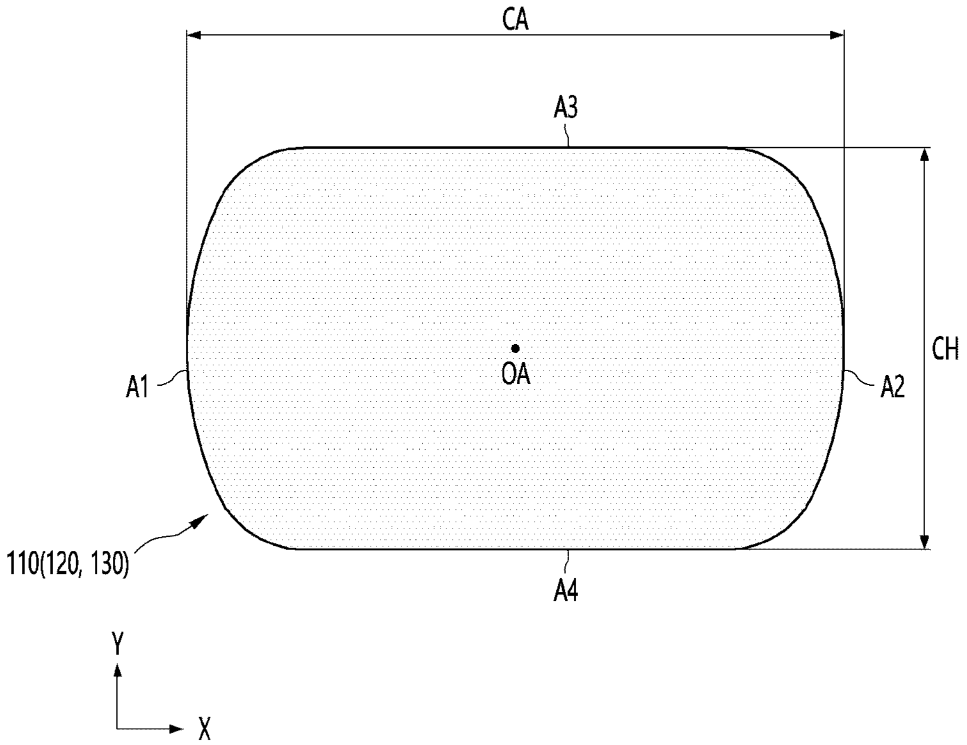
FIG. 3 is a diagram for explaining a D-cut shape of at least one lens in the optical system according to the first embodiment.
Figure 4:
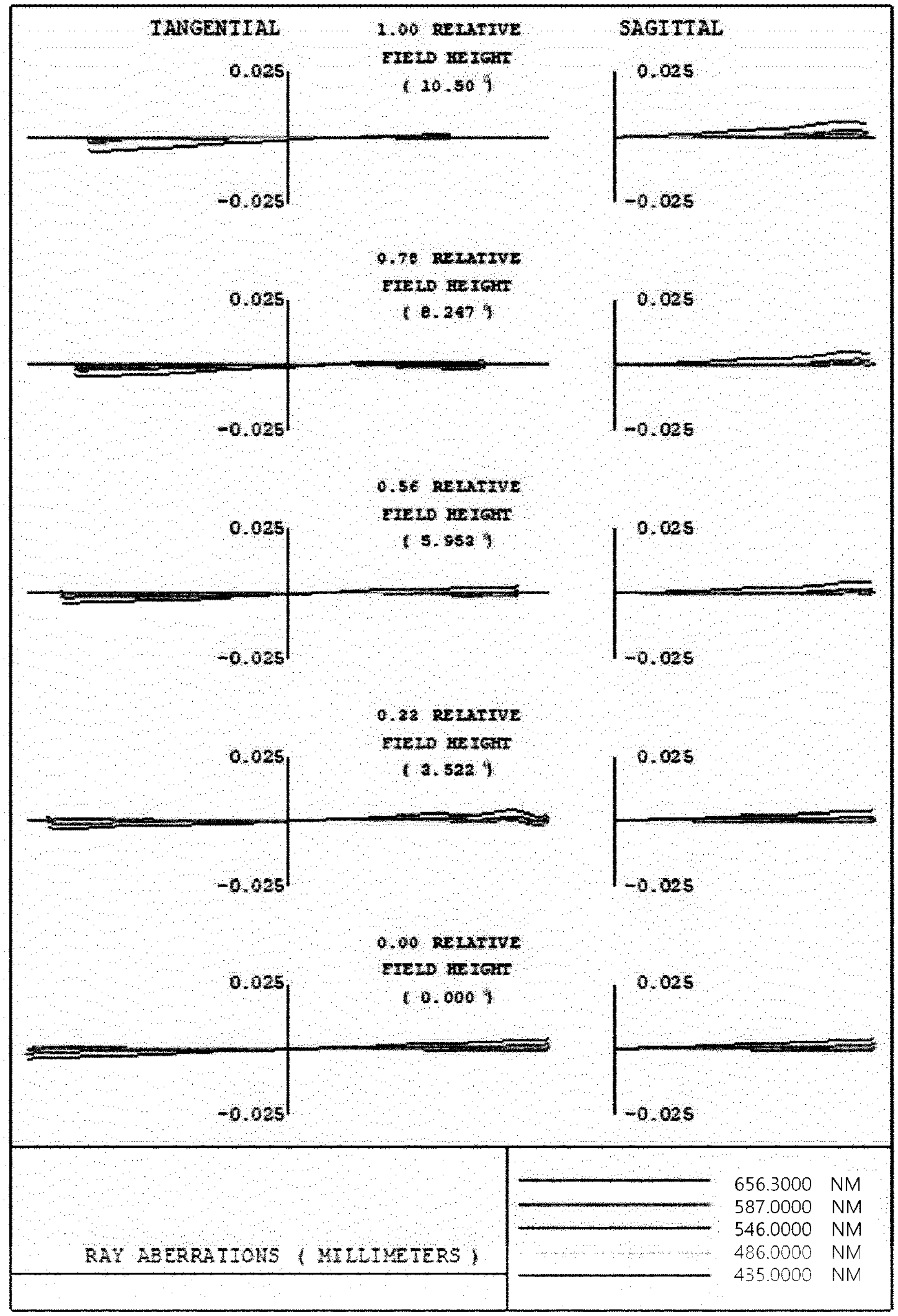
FIG. 4 is a graph showing MTF characteristics and aberration characteristics of the optical system according to the first embodiment.
Figure 5:
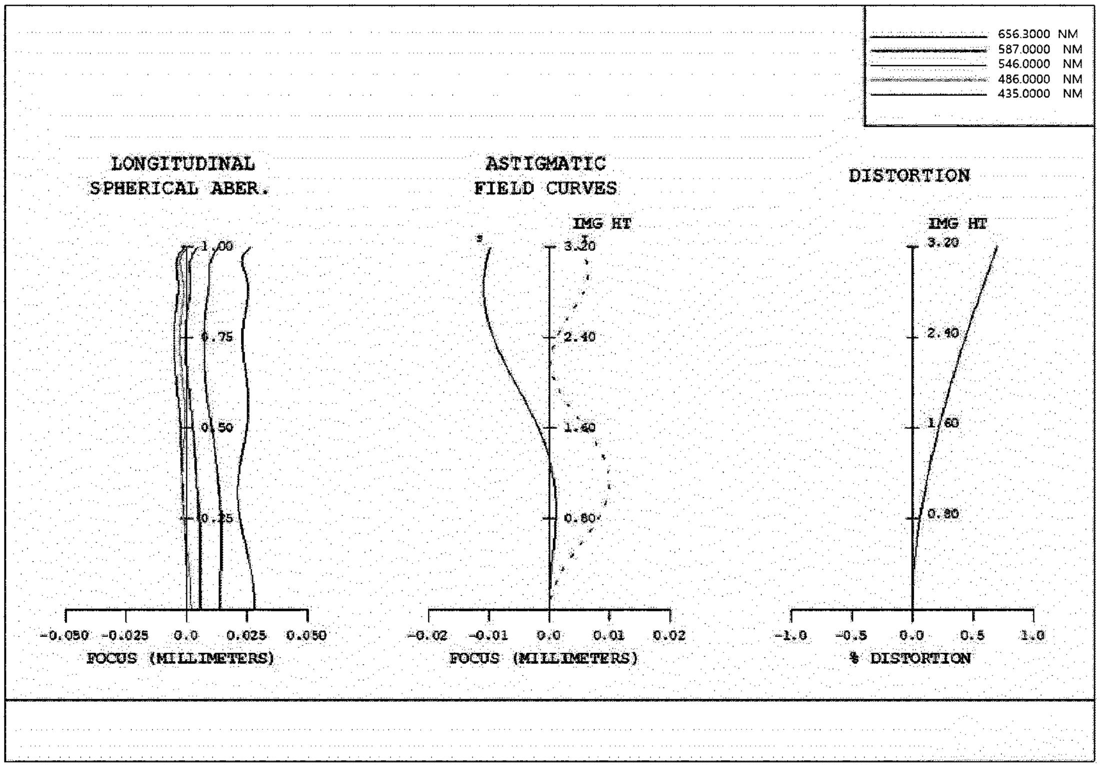
FIG. 5 is a graph showing aberration characteristics of the optical system according to the first embodiment.

Hereinafter, the optical system according to the first embodiment will be described in detail. FIGS. 1 and 2 are configuration diagrams showing side cross-sections of the optical system according to the first embodiment in different directions, FIG. 3 is a diagram illustrating a D-cut shape in the optical system according to the first embodiment, and FIGS. 4 and 5 are graphs showing MTF characteristics and aberration characteristics of the optical system according to the first embodiment.

Referring to FIGS. 1 to 5, the optical system 1000 according to the first embodiment may include a plurality of lenses. For example, the optical system 1000 may include four or more lenses. In detail, the optical system 1000 may include 5 or more lenses.

The optical system 1000 may include a first lens 110, a second lens 120, a third lens 130, a fourth lens 140 a fifth lens 150, a filter 500, and an image sensor 300 sequentially disposed along the optical axis OA from the object side toward the image side. The first to fifth lenses 110, 120, 130, 140, and 150 may be sequentially disposed along the optical axis OA of the optical system 1000. In this case, the first lens 110 may be disposed closest to the object side among the plurality of lenses 110, 120, 130, 140, and 150, and the fifth lens 150 may be disposed most adjacent to the image side. Also, the first and second lenses 110 and 120 may be continuously disposed along the optical axis OA. In more detail, the first to fifth lenses 110, 120, 130, 140, and 150 may be continuously disposed along the optical axis OA.

The first lens 110 may have positive (+) refractive power. The first lens 110 may include a plastic or glass material. For example, the first lens 110 may be made of a plastic material. The first lens 110 may include a first surface S1 defined as an object-side surface and a second surface S2 defined as an image-side surface. The first surface S1 may be concave, and the second surface S2 may be convex. That is, the first lens 110 may have a meniscus shape convex in the image-side direction. At least one of the first surface S1 and the second surface S2 may be an aspherical surface. For example, both the first surface S1 and the second surface S2 may be aspherical.

The second lens 120 may have positive (+) refractive power. The second lens 120 may include a plastic or glass material. For example, the second lens 120 may be made of a plastic material. The second lens 120 may include a third surface S3 defined as an object-side surface and a fourth surface S4 defined as an image-side surface. The third surface S3 may be convex, and the fourth surface S4 may be concave. That is, the second lens 120 may have a meniscus shape convex toward the object side. At least one of the third and fourth surfaces S3 and S4 may be an aspherical surface. For example, both the third surface S3 and the fourth surface S4 may be aspheric surfaces.

The third lens 130 may have negative (−) refractive power. The third lens 130 may include a plastic or glass material. For example, the third lens 130 may be made of a plastic material. The third lens 130 may include a fifth surface S5 defined as an object-side surface and a sixth surface S6 defined as an image-side surface. The fifth surface S5 may be convex, and the sixth surface S6 may be concave. That is, the third lens 130 may have a meniscus shape convex toward the object side. At least one of the fifth surface S5 and the sixth surface S6 may be an aspheric surface. For example, both the fifth surface S5 and the sixth surface S6 may be aspheric surfaces.

The fourth lens 140 may have positive (+) refractive power. The fourth lens 140 may include a plastic or glass material. For example, the fourth lens 140 may be made of a plastic material. The fourth lens 140 may include a seventh surface S7 defined as an object-side surface and an eighth surface S8 defined as an image-side surface. The seventh surface S7 may be convex, and the eighth surface S8 may be concave. That is, the fourth lens 140 may have a meniscus shape convex toward the object side. At least one of the seventh surface S7 and the eighth surface S8 may be an aspheric surface. For example, both the seventh surface S7 and the eighth surface S8 may be aspheric surfaces.

The fifth lens 150 may have positive (+) refractive power. The fifth lens 150 may include a plastic or glass material. For example, the fifth lens 150 may be made of a plastic material. The fifth lens 150 may include a ninth surface S9 defined as an object-side surface and a tenth surface S10 defined as an image-side surface. The ninth surface S9 may be convex, and the ninth surface S9 may be concave. That is, the fifth lens 150 may have a meniscus shape convex toward the object side. At least one of the ninth surface S9 and the tenth surface S10 may be an aspheric surface. For example, both the ninth surface S9 and the tenth surface S10 may be aspheric surfaces.

The optical system 1000 may include an aperture stop (not shown). The aperture stop may be disposed between an object and the first lens 110 or between the first to third lenses 110, 120, and 130. For example, the object-side surface (fifth surface S5) of the third lens 130 may serve as an aperture stop.

The first to fifth lenses 110, 120, 130, 140, and 150 may have set effective apertures (clear apertures). For example, each of the first to tenth surfaces S1, S2, S3, S4, S5, S6, S7, S8, S9, and S10 may have a set effective aperture (clear aperture). An object-side surface or an image-side surface of one lens selected from the first lens 110 and the second lens 120 may have the largest effective aperture among the first to tenth surfaces S1, S2, S3, S4, S5, S6, S7, S8, S9, and S10 of the first to fifth lenses 110, 120, 130, 140, and 150. For example, the optical system 1000 may include at least one lens surface having an effective aperture larger than the object-side surface (first surface S1) of the first lens HO. In detail, the optical system 1000 may include one lens surface having an effective aperture larger than the first surface S1. The size of the effective aperture of the image-side surface (second surface S2) of the first lens 110 may be larger than the size of the effective aperture of the object-side surface (first surface Sp of the first lens 110. The effective aperture of the second surface S2 may be the largest among the first to tenth surfaces S1, S2, S3, S4, S5, S6, S7, S8, S9, and S10. In addition, the size of the effective aperture of the first surface S1 may be next largest after the size of the effective aperture of the second surface S2 among the first to tenth surfaces S1 to S10. The size of the effective aperture of the second lens 120 may be smaller than the size of the effective aperture of the first lens 110. For example, the object-side surface (third surface S3) and image-side surface (fourth surface S4) of the second lens 120 may have an effective aperture smaller than that of the object-side surface (first surface S1) and the image-side surface (second surface S2) of the first lens 110. Among the first to tenth surfaces S1 to S10, the size of the effective aperture of the third surface S3 may be next largest after the effective aperture of the first surface S1. In addition, the size of the effective aperture of the fourth surface S4 may be next largest after of the effective aperture of the third surface S3 among the first to tenth surfaces S1, S2, S3, S4, S5, S6, S7, S8, S9, and S10.

Alternatively, the effective aperture of the second lens 120 may be larger than that of the first lens 110. For example, the size of the effective aperture of the object-side surface (third surface S3) of the second lens 120 may be greater than the size of the effective aperture of one surface selected from among the object-side surface (first surface S1) and the image-side surface (second surface S2) of the first lens 110. In detail, the size of the effective aperture of the third surface S3 may be larger than the sizes of the effective apertures of the first surface S1 and the second surface S2. In this case, the size of the effective aperture of the third surface S3 may be greater than the size of the first surface S1 and the second surface S2 within a range less than 1.5 times the size of the effective aperture of the second surface S2.

Referring to FIG. 3, at least one of the first to fifth lenses 110, 120, 130, 140, and 150 may have a non-circular shape. For example, each of the first lens 110, the second lens 120, and the third lens 130 may have a non-circular shape. When each of the first to third lenses 110, 120, and 130 is viewed from the front corresponding to the optical axis OA, an effective region of each lens may have a non-circular shape. In detail, the effective region of each of the first to third lenses 110, 120, and 130 may include first to fourth corners A1, A2, A3, and A4. The first edge A1 and the second edge A2 may be edges facing each other in a first direction (x-axis direction) perpendicular to the optical axis OA. The first edge A1 and the second edge A2 may have a curved shape. The third edge A3 and the fourth edge A4 may be edges facing each other in a second direction (y-axis direction) perpendicular to the optical axis OA and the first direction. The third edge A3 and the fourth edge A4 may be edges connecting ends of the first edge A1 and the second edge A2. The third edge A3 and the fourth edge A4 may have a straight-line shape. That is, the first to third lenses 110, 120, and 130 may have a D-cut shape.

The first to third lenses 110, 120, and 130 may have the aforementioned non-circular shape during the manufacturing process. For example, when the first to third lenses 110, 120, and 130 include a plastic material, they may be manufactured in a non-circular shape during an injection process. Alternatively, the first to third lenses 110, 120, and 130 may be manufactured in a circular shape through an injection process, and a partial region is cut in a subsequent cutting process to form the third edge A3 and the fourth edge A4. Accordingly, the effective region of each of the first to third lenses 110, 120, and 130 may have a set size. For example, a length CA of a virtual first straight line passing through the optical axis OA and connecting the first edge A1 and the second edge A2 may be longer than the length CH of a virtual second straight line passing through the optical axis OA and connecting the third edge A3 and the fourth edge A4. Here, the length CA of the first straight line may mean a maximum clear aperture CA of an effective aperture of each of the first to third lenses 110, 120, and 130, and the length CH of the second straight line may mean a minimum clear height CH of an effective aperture of each of the first to third lenses 110, 120, and 130. In the above description, it has been described that the effective regions of the first to third lenses 110, 120, and 130 have a non-circular shape, but without being limited thereto, the effective regions of each lens may have a circular shape and the ineffective regions may have a non-circular shape.

The optical system 1000 according to the first embodiment may satisfy at least one of equations described below. Accordingly, when the optical system 1000 according to the first embodiment satisfies at least one of the following equations, it may have improved optical characteristics. In addition, when the optical system 1000 satisfies at least one or two or more of the above equations, it may be implemented smaller and more compact. In addition, when the optical system 1000 satisfies at least one of the above equations, it may be applied to a folded camera having a smaller thickness, so that a device including the camera may be manufactured with a thin thickness.

$$9 < EFL < 40 \quad \text{[Equation 1]}$$

In Equation 1, EFL means the effective focal length (mm) of the optical system 1000. In detail, EFL of the optical system 1000 may be 11<EFL<30. In more detail, EFL of the optical system 1000 may be 13<EFL<26.

$$0.95 < L1S1/L1S2 < 1 \quad \text{[Equation 2]}$$

In Equation 2, L1S1 means the effective aperture (mm) of the object-side surface (first surface S1) of the first lens 110, and L1S2 means the effective aperture (mm) of the image-side surface (second surface S2) of the first lens 110. In detail, L1S1/L1S2 may satisfy 0.96<L1S1/L1S2<1. In detail, L1S1/L1S2 may satisfy 0.99<L1S1/L1S2<1.

$$-8 < R\_L1/R\_L3 < 0.98 \quad \text{[Equation 3]}$$

In Equation 3, R_L1 means the radius (mm) of curvature of the object-side surface (first surface S1) of the first lens 110, and R_L3 means the radius (mm) of curvature of the object-side surface (third surface S3) of the second lens 120. In detail, R_L1 and R_L3 may satisfy −8<R_L1/R_L3<−2.

$$0.1 < TH\_L1/TH\_L2 < 0.75 \quad \text{[Equation 4]}$$

In Equation 4, TH_L1 means the center thickness (mm) of the first lens 110, and TH_L2 means the center thickness (mm) of the second lens 120. In detail, TH_L1 and TH_L2 may satisfy 0.2<TH_L1/TH_L2<0.65. In more detail, TH_L1 and TH_L2 may satisfy 0.3<TH_L1/TH_L2<0.55.

$$0.52 < CHn\ (n < 4)/CAn\ (n < 4) < 0.98 \quad \text{[Equation 5]}$$

In Equation 5, CHn (n<4) means the minimum clear height (mm) of the effective aperture of the n-th lens. In detail, CHn (n<4) means the minimum size (mm) of an effective aperture of one lens selected from the first to third lenses 110, 120, and 130. Also, CAn (n<4) means the maximum clear aperture (mm) of the n-th lens. In detail, CAn (n<4) means the maximum size (mm) of an effective aperture of one lens selected from among the first to third lenses 110, 120, and 130.

$$20 < |f1| - |f2| < 150 \quad \text{[Equation 6]}$$

In Equation 6, f1 means the focal length (mm) of the first lens 110, and f2 means the focal length (mm) of the second lens 120.

$$2 < BFL/ImgH < 5 \quad \text{[Equation 7]}$$

In Equation 7, BFL (Back focal length) means the distance (mm) in the optical axis direction from the image-side surface of the lens closest to the image sensor 300 among the plurality of lenses to the image sensor 300. In addition, ImgH means a value of ½ of the diagonal length (mm) of the effective region of the image sensor 300. That is, the ImgH means a vertical distance (mm) from the optical axis on the upper surface of the image sensor 300 to a region of one field.

$$0.35 < BFL/EFL < 0.75 \quad \text{[Equation 8]}$$

In Equation 8, BFL (Back focal length) means the distance (mm) in the optical axis direction from the image-side surface of the lens closest to the image sensor 300 among the plurality of lenses to the image sensor 300. Also, EFL means an effective focal length (mm) of the optical system 1000.

$$1.5 < TTL/BFL < 2.5 \quad \text{[Equation 9]}$$

In Equation 9, TTL (Total track length) means a distance (mm) in the optical axis direction from the object-side surface (first surface S1) of the lens (first lens 110) closest to the object side among the plurality of lenses to the image sensor 300. Also, BFL (back focal length) means a distance (mm) in an optical axis direction from an image-side surface of a lens closest to the image sensor 300 among the plurality of lenses to the image sensor 300.

$$0.75 < DL2/TTL < 0.9 \quad \text{[Equation 10]}$$

In Equation 10, DL2 means a distance (mm) in the optical axis direction from the object-side surface (third surface S3) of the lens (second lens 120) adjacent to the object side among the plurality of lenses to the image sensor 300. In addition, TTL (Total track length) means a distance (mm) in the optical axis direction from the object-side surface (first surface S1) of the lens (first lens 110) closest to the object side among the plurality of lenses to the image sensor 300.

When the optical system 1000 includes 5 lenses as in the first embodiment, the following Equations 11 to 14 may be further satisfied.

$$|f3| < |f2| < |f5| < |f1| < |f4| \quad \text{[Equation 11]}$$

In Equation 11, f1 means the focal length of the first lens 110, and f2 means the focal length of the second lens 120. Also, f3 means the focal length of the third lens 130, f4 means the focal length of the fourth lens 140, and f5 means the focal length of the fifth lens 150.

$$0.5 < TH\_L1/d12 < 1 \quad \text{[Equation 12]}$$

In Equation 12, TH_L1 means the center thickness (mm) of the first lens 110, and d12 is the distance (mm) between the first lens 110 and the second lens 120 in the direction of the optical axis (OA).

$$2 < f1/EFL < 4 \quad \text{[Equation 13]}$$

In Equation 13, f1 means a focal length (mm) of the first lens 110, and EFL means an effective focal length (mm) of the optical system 1000.

$$Z = \frac{cY^2}{1+\sqrt{1-(1+K)c^2Y^2}} + AY^4 + BY^6 + CY^8 + DY^{10} + EY^{12} + FY^{14} + \ldots \quad \text{[Equation 14]}$$

In Equation 14, Z is Sag and may mean a distance in a direction of the optical axis from an arbitrary position on the aspherical surface to the apex of the aspheric surface. Also, Y may mean a distance in a direction perpendicular to the optical axis from an arbitrary position on the aspherical surface to the optical axis. Also, c may mean the curvature of the lens, and K may mean the conic constant. Also, A, B, C, D, E, and F may mean aspheric constants.

The optical system 1000 according to the first embodiment may satisfy at least one or two or more of Equations 1 to 13. In particular, the optical system 1000 may include at least one lens surface having an effective aperture larger than that of the first surface S1 and may have improved optical characteristics. In the optical system 1000, the first to third lenses 110, 120, and 130 may have a non-circular shape, for example, a D-cut shape. Accordingly, the optical system 1000 may be implemented in a smaller size and may be provided in a compact form compared to a circular shape. When the optical system 1000 satisfies at least one of Equations 1 to 13, it may be applicable to a folded camera. In detail, the optical system 1000 may include the light path changing member and change light incident in a direction perpendicular to the surface of the device applied thereto into a direction parallel to the surface of the device. Accordingly, the optical system 1000 including a plurality of lenses may have a thinner thickness within the device, and thus the device may be provided thinner.

TABLE 1

| Lens | Surface | Radius (mm) of curvature | Thickness or distance (mm) | effective aperture (mm) | Refractive index | Abbe number |
|---|---|---|---|---|---|---|
| Lens 1 | S1 | −24.8879 | 0.6145 | 2.55 | 1.5368 | 55.6762 |
| | S2 | −11.3062 | 0.8301 | 2.569937 | | |
| Lens 2 | S3 | 4.0599 | 2.0000 | 2.462161 | 1.5368 | 55.6762 |
| | S4 | 20.0747 | 0.1947 | 2.120959 | | |
| Lens 3 | S5 | 18.3763 | 0.8703 | 2.051543 | 1.6206 | 25.9493 |
| | S6 | 2.8982 | 2.0369 | 1.769202 | | |
| Lens 4 | S7 | 4.0766 | 0.3500 | 1.893842 | 1.5368 | 55.6762 |
| | S8 | 4.7148 | 0.1262 | 1.852053 | | |
| Lens 5 | S9 | 6.5955 | 0.4000 | 1.851872 | 1.6689 | 20.3611 |
| | S10 | 11.1396 | | 1.85 | | |

TABLE 2

| Item | First embodiment |
|---|---|
| TTL | 17.4958 |
| EFL | 17.1422 |
| BFL | 10.0731 |
| ImgH | 3.2 |
| f1 | 37.9952 |
| f2 | 9.0840 |
| f3 | −5.6663 |
| f4 | 47.0826 |
| f5 | 23.3461 |

Table 1 shows the radius of curvature, the thickness (mm) of the center of each lens, the distance (mm) between the lenses, the size of the effective aperture, the refractive index, and Abbe number of the first to fifth lenses 110, 120, 130, 140, and 150 according to the first embodiment. Table 2 relates to TTL (total track length), EFL (effective focal length), BFL (back focal length), and focal lengths of lenses of the optical system 1000 according to the first embodiment.

Referring to Table 1, the refractive indices of the first lens 110, the second lens 120, and the fourth lens 140 may be the same. In addition, the refractive indices of the first lens 110, the second lens 120, and the fourth lens 140 may be smaller than that of the third lens 130. Also, the refractive index of the third lens 130 may be smaller than the refractive index of the fifth lens 150. Abbe numbers of the first lens 110, the second lens 120, and the fourth lens 140 may be equal to each other. Also, the Abbe numbers of the first lens 110, the second lens 120, and the fourth lens 140 may be greater than the Abbe numbers of the third lens 130. Also, the Abbe number of the third lens 130 may be greater than the Abbe number of the fifth lens 150. Each of the surfaces S1, S2, S3, S4, S5, S6, S7, S8, S9, and S10 of the first to fifth lenses 110, 120, 130, 140, and 150 may have set effective aperture (clear apertures). In detail, in the optical system 1000, the size of the effective aperture of the second surface S2 may be larger than the size of the effective aperture of the first surface S1, and the size of the effective aperture of the first surface S1 may be greater than the size of the effective aperture of the third surface S3. Although not disclosed in Table 1, the second lens 120 may include at least one surface having an effective aperture greater than that of the first lens 110. For example, the size of the effective aperture of the third surface S3 may be larger than that of the first surface S1. In addition, the size of the effective aperture of the third surface S3 may be larger than the sizes of the effective apertures of the first surface S1 and the second surface S2.

Referring to Table 2, the effective focal length EFL of the optical system 1000 may be smaller than the focal length f1 of the first lens 110. Also, the effective focal length EFL of the optical system 1000 may be greater than the focal length f2 of the second lens 120.

TABLE 3

| | Equation | First embodiment |
|---|---|---|
| Equation 1 | $9 < EFL < 40$ | Satisfaction |
| Equation 2 | $0.95 < L1S1/L1S2 < 1$ | 0.9922422 |
| Equation 3 | $-8 < R\_L1/R\_L3 < 0.98$ | −6.130243 |
| Equation 4 | $0.1 < TH\_L1/TH\_L2 < 0.75$ | 0.307245 |
| Equation 5 | $0.52 < CH_{n(n<4)}/CA_{n(n<4)} < 0.98$ | Satisfaction |
| Equation 6 | $20 < \lvert f1\rvert - \lvert f2\rvert < 150$ | 28.9112 |
| Equation 7 | $2 < BFL/ImgH < 5$ | 3.1478481 |
| Equation 8 | $0.35 < BFL/EFL < 0.75$ | 0.5876208 |
| Equation 9 | $1.5 < TTL/BFL < 2.5$ | 1.7368802 |
| Equation 10 | $0.75 < DL2/TTL < 0.9$ | 0.8031203 |
| Equation 11 | $\lvert f3\rvert < \lvert f2\rvert < \lvert f5\rvert < \lvert f1\rvert < \lvert f4\rvert$ | Satisfaction |
| Equation 12 | $0.5 < TH\_L1/d12 < 1$ | 0.740283 |
| Equation 13 | $2 < f1/EFL < 4$ | 2.216467 |

Table 3 shows result values of the optical system 1000 of the first embodiment for the above-described equations. Referring to Table 3, it may be seen that the optical system 1000 according to the first embodiment satisfies at least one or two or more of Equations 1 to 13. In detail, it may be seen that the optical system 1000 satisfies all of Equations 1 to 13. Accordingly, the optical system 1000 according to the first embodiment may have MTF (Modulation Transfer Function) characteristics and aberration characteristics as shown in FIGS. 4 and 5. In detail, FIG. 5 is a graph of an aberration diagram of the optical system 1000 according to the first embodiment, and is graph in which spherical aberration, astigmatic field curves, and distortion are measured from left to right. In FIG. 5, the X axis may represent a focal length (mm) or distortion (%), and the Y axis may represent the height of an image sensor. In addition, a graph of spherical aberration is a graph of light in a wavelength band of about 435 nm, about 486 nm, about 546 nm, about 587 nm, and about 656 nm, and a graph of astigmatism and distortion is a graph of light in a wavelength band of 546 nm. The optical system 1000 according to the first embodiment may have improved optical characteristics. In detail, the optical system 1000 may include at least one lens surface having a larger effective aperture than the first surface S1 of the first lens 110 and may have improved optical characteristics. In the optical system 1000, the first to third lenses 110, 120, and 130 may have a non-circular shape, for example, a D-cut shape. Accordingly, the optical system 1000 may be implemented in a smaller size and can be provided in a compact form compared to a circular shape. The optical system 1000 may include a plurality of lenses and a light path changing member (not shown). Accordingly, the optical system 1000 may be applied to a folded camera that can have a smaller thickness, and a device including the camera may be manufactured with a smaller thickness.

Second Embodiment

Figure 6:
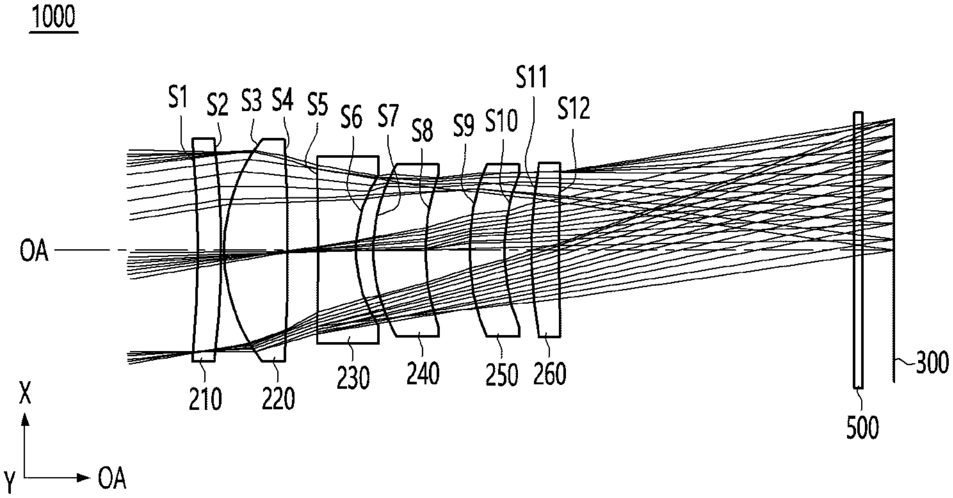
FIG. 6 is a view showing a side cross-section of the optical system according to the second embodiment in the first direction X.
Figure 7:
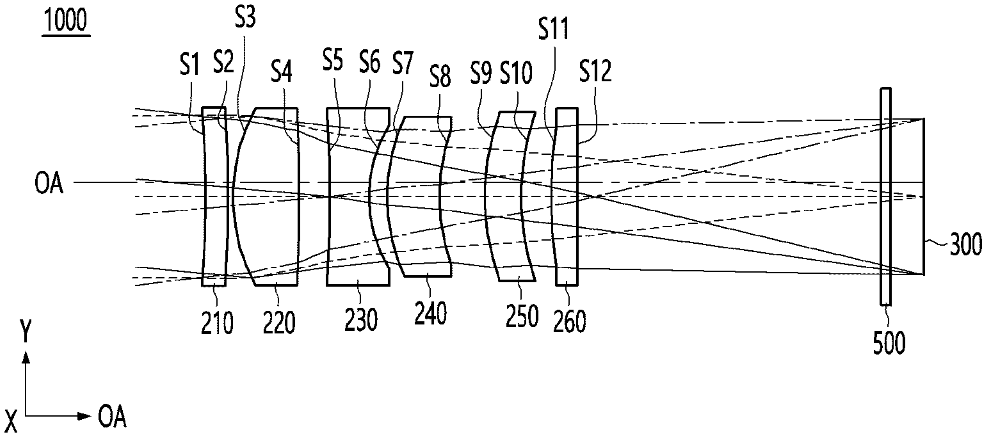
FIG. 7 is a view showing a side cross-section of the second direction Y of the optical system according to the second embodiment.
Figure 8:
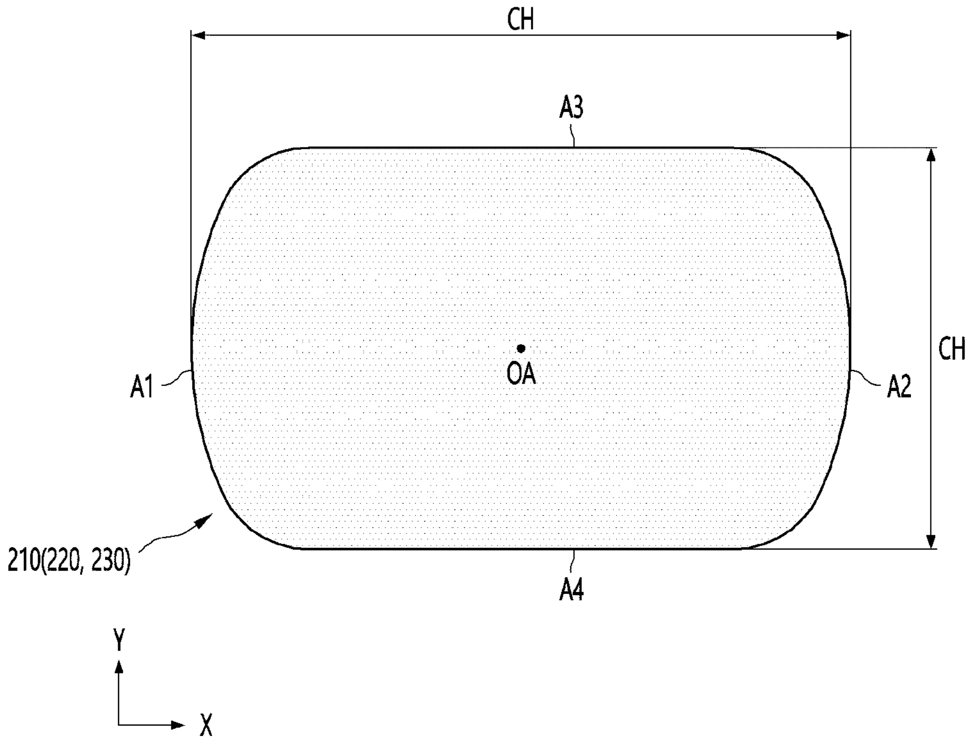
FIG. 8 is a diagram for explaining a D-cut shape of at least one lens in an optical system according to a second embodiment.
Figure 9:
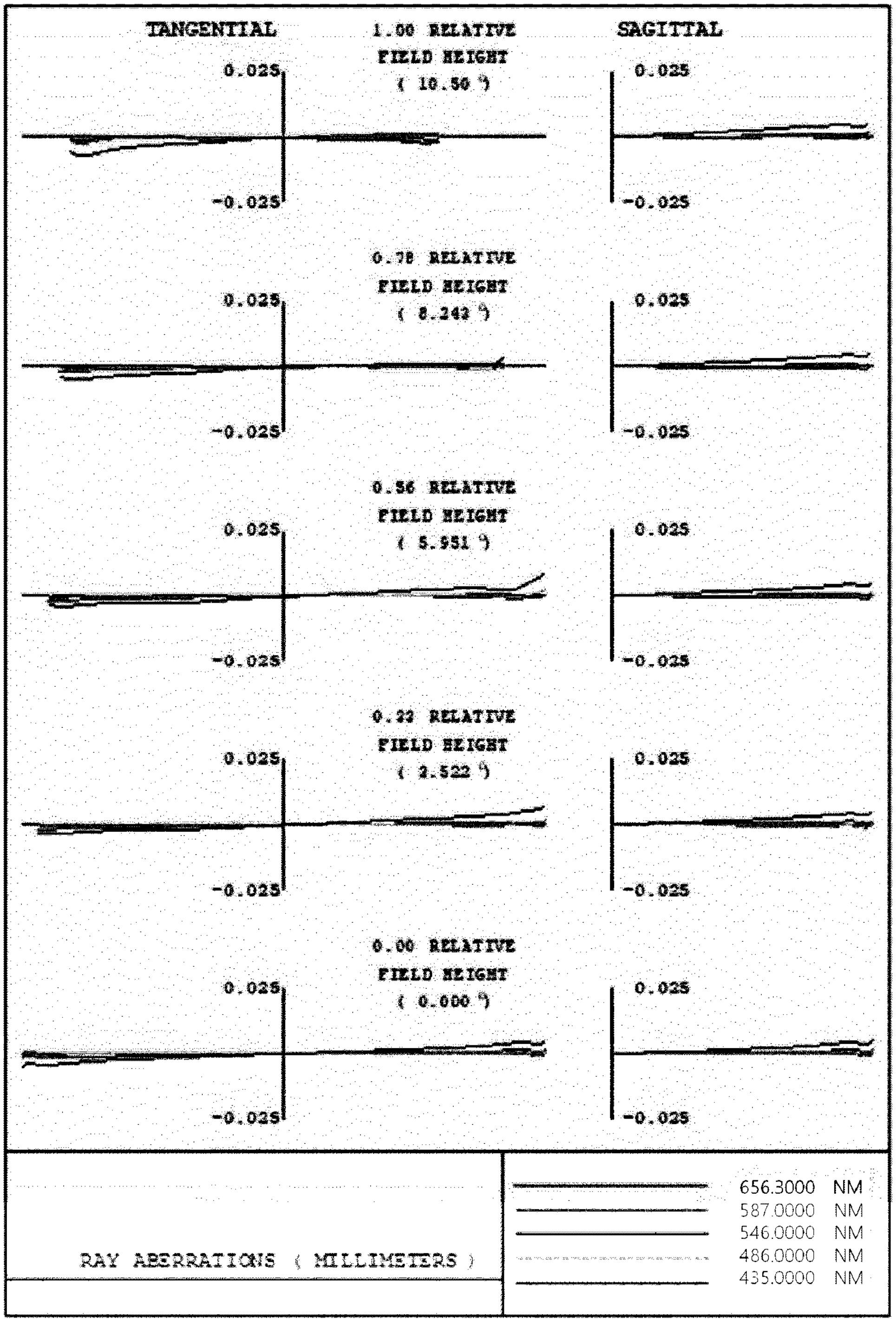
FIG. 9 is a graph showing MTF characteristics of an optical system according to a second embodiment.
Figure 10:
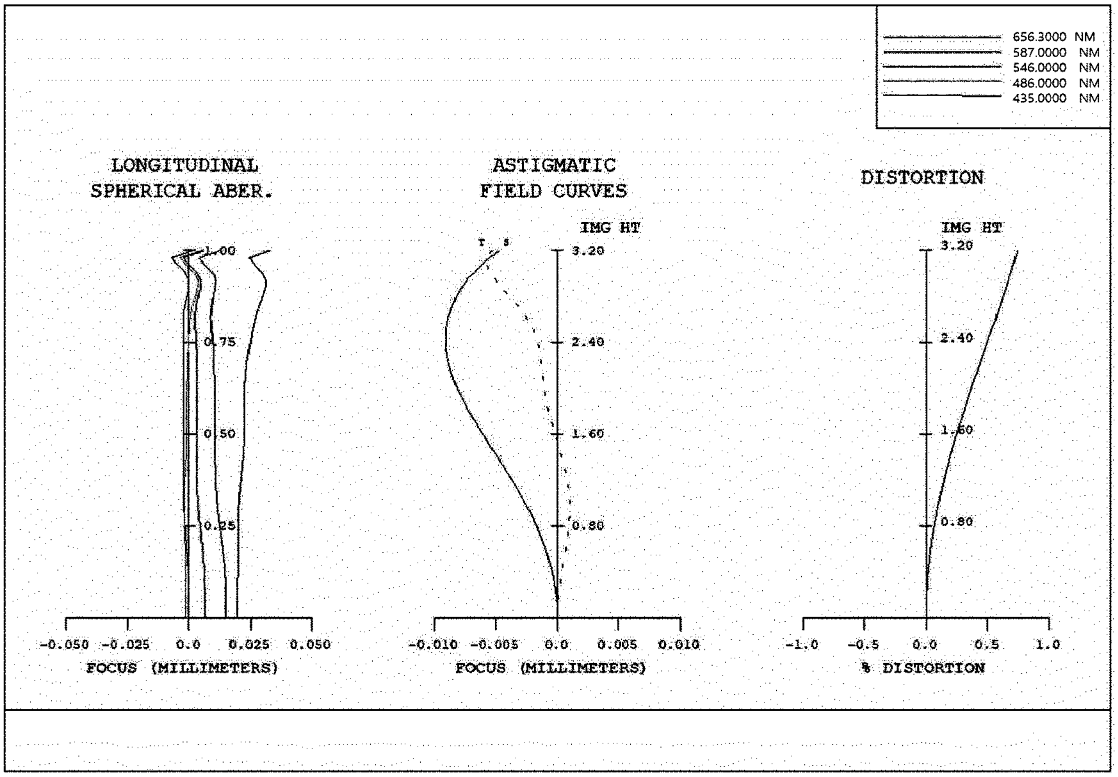
FIG. 10 is a graph showing aberration characteristics of an optical system according to a second embodiment.

Hereinafter, the optical system according to the second embodiment will be described in detail. FIGS. 6 and 7 are configuration diagrams of the optical system according to the second embodiment, and FIG. 8 is a diagram for explaining a D-cut shape in the optical system according to the second embodiment. FIGS. 9 and 10 are graphs showing MTF characteristics and aberration characteristics of the optical system according to the second embodiment.

Referring to FIGS. 6 to 10, the optical system 1000 according to the second embodiment may include a plurality of lenses. For example, the optical system 1000 may include four or more lenses. In detail, the optical system 1000 may include 6 or more lenses.

The optical system 1000 may include a first lens 210, a second lens 120, a third lens 230, a fourth lens 240, a fifth lens 250, a sixth lens 260, a filter 500, and an image sensor 300 sequentially disposed along the optical axis OA from the object side to the image side. The first to sixth lenses 210, 220, 230, 240, 250, and 260 may be sequentially disposed along the optical axis OA of the optical system 1000. In this case, the first lens 210 may be disposed closest to the object side among the plurality of lenses 210, 220, 230, 240, 250, and 260, and the sixth lens 260 may be disposed most adjacent to the image side. Also, the first and second lenses 210 and 220 may be continuously disposed along the optical axis OA. In more detail, the first to sixth lenses 210, 220, 230, 240, 250, and 260 may be continuously disposed along the optical axis OA.

The first lens 210 may have positive (+) refractive power. The first lens 210 may include a plastic or glass material. For example, the first lens 210 may be made of a plastic material. The first lens 210 may include a first surface S1 defined as an object-side surface and a second surface S2 defined as an image-side surface. The first surface S1 may be concave, and the second surface S2 may be convex. That is, the first lens 210 may have a meniscus shape convex in the image-side direction. At least one of the first surface S1 and the second surface S2 may be an aspherical surface. For example, both the first surface S1 and the fourth surface S4 may be aspherical.

The second lens 220 may have positive (+) refractive power. The second lens 220 may include a plastic or glass material. For example, the second lens 220 may be made of a plastic material. The second lens 220 may include a third surface S3 defined as an object-side surface and a fourth surface S4 defined as an image-side surface. The third surface S3 may be convex, and the fourth surface S4 may be convex. That is, the second lens 220 may have a convex shape on both sides. At least one of the third and fourth surfaces S3 and S4 may be an aspherical surface. For example, both the third surface S3 and the fourth surface S4 may be aspheric surfaces.

The third lens 230 may have negative (−) refractive power. The third lens 230 may include a plastic or glass material. For example, the third lens 230 may be made of a plastic material. The third lens 230 may include a fifth surface S5 defined as an object-side surface and a sixth surface S6 defined as an image-side surface. The fifth surface S5 may be concave, and the sixth surface S6 may be concave. That is, the third lens 230 may have a concave shape on both sides. At least one of the fifth surface S5 and the sixth surface S6 may be an aspheric surface. For example, both the fifth surface S5 and the sixth surface S6 may be aspheric surfaces.

The fourth lens 240 may have positive (+) refractive power. The fourth lens 240 may include a plastic or glass material. For example, the fourth lens 240 may be made of a plastic material. The fourth lens 240 may include a seventh surface S7 defined as an object-side surface and an eighth surface S8 defined as an image-side surface. The seventh surface S7 may be convex, and the eighth surface S8 may be concave. That is, the fourth lens 240 may have a meniscus shape convex toward the object side. At least one of the seventh surface S7 and the eighth surface S8 may be an aspheric surface. For example, both the seventh surface S7 and the eighth surface S8 may be aspheric surfaces.

The fifth lens 250 may have positive (+) refractive power. The fifth lens 250 may include a plastic or glass material. For example, the fifth lens 250 may be made of a plastic material. The fifth lens 250 may include a ninth surface S9 defined as an object-side surface and a tenth surface S10 defined as an image-side surface. The ninth surface S9 may be convex, and the ninth surface S9 may be concave. That is, the fifth lens 250 may have a meniscus shape convex toward the object side. At least one of the ninth surface S9 and the tenth surface S10 may be an aspheric surface. For example, both the ninth surface S9 and the tenth surface S10 may be aspheric surfaces.

The sixth lens 260 may have positive (+) refractive power. The sixth lens 260 may include a plastic or glass material. For example, the sixth lens 260 may be made of a plastic material. The sixth lens 260 may include an eleventh surface S11 defined as an object-side surface and a twelfth surface S12 defined as an image-side surface. The eleventh surface S11 may be convex, and the twelfth surface S12 may be concave. That is, the sixth lens 260 may have a meniscus shape convex toward the object side. At least one of the eleventh surface S11 and the twelfth surface S12 may be an aspheric surface. For example, both the eleventh surface S11 and the twelfth surface S12 may be aspherical surfaces.

The optical system 1000 may include an aperture stop (not shown). The aperture stop may be disposed between an object and the first lens 210 or between the first to third lenses 210, 220, and 230. For example, the aperture stop may be disposed between the second lens 220 and the third lens 230.

The first to sixth lenses 210, 220, 230, 240, 250, and 260 may have set effective apertures (clear apertures). For example, each of the first to twelfth surfaces S1, S2, S3, S4, S5, S6, S7, S8, S9, S10, S11, and S12 may have a set effective aperture. An object-side surface or an image-side surface of one lens selected from the first lens 210 and the second lens 220 may have the largest effective aperture among the first to twelfth surfaces S1, S2, S3, S4, S5, S6, S7, S8, S9, S10, S11, and S12 of the first to sixth lenses 210, 220, 230, 240, 250, and 260. For example, the optical system 1000 may include at least one lens surface having an effective aperture larger than the object-side surface (first surface S1) of the first lens 210. In detail, the optical system 1000 may include one lens surface having an effective aperture larger than the first surface S1.

The size of the effective aperture of the image-side surface (second surface S2) of the first lens 210 may be larger than the size of the effective aperture of the object-side surface (first surface S1) of the first lens 210. The effective aperture of the second surface S2 may be the largest among the first to twelfth surfaces S1 to S12. In addition, the size of the effective aperture of the first surface S1 may be next largest after the second surface S2 among the first to twelfth surfaces S1 to S12.

The size of the effective aperture of the second lens 220 may be smaller than the size of the effective aperture of the first lens 210. For example, the object-side surface (third surface S3) and image-side surface (fourth surface S4) of the second lens 220 may have the effective apertures smaller than the effective apertures of the object-side surface (first surface S1) and the image-side surface (second surface S2) of the first lens 110. The size of the effective aperture of the third surface S3 may be the largest next largest after the first surface S1 among the first to twelfth surfaces S1 to S12. Also, the size of the effective aperture of the fourth surface S4 may be larger than that of the third surface S3 among the first to twelfth surfaces S1 to S12. Also, among the first to twelfth surfaces S1 to S12, the effective aperture of the image-side surface (eighth surface S8) of the fourth lens 240 may be the smallest. Alternatively, the size of the effective aperture of the second lens 220 may be larger than that of the first lens 210. For example, the size of the effective aperture of the object-side surface (third surface S3) of the second lens 220 may be greater than the size of the effective aperture of one surface selected from among the object-side surface (first surface S1) and the image-side surface (second surface S2) of the first lens 210. In detail, the size of the effective aperture of the third surface S3 may be larger than the sizes of the effective apertures of the first surface S1 and the second surface S2. In this case, the size of the effective aperture of the third surface S3 may be greater than the size of the first surface S1 and the second surface S2 within a range less than 1.5 times the size of the effective aperture of the second surface S2.

Referring to FIG. 8, at least one or two or more of the first to sixth lenses 210, 220, 230, 240, 250, and 260 may have a non-circular shape. For example, each of the first lens 210, the second lens 220, and the third lens 230 may have a non-circular shape. When each of the first to third lenses 210, 220, and 230 is viewed from the front corresponding to the optical axis OA, an effective region of each lens may have a non-circular shape. In detail, the effective region of each of the first to third lenses 210, 220, and 230 may include first to fourth corners A1, A2, A3, and A4. The first edge A1 and the second edge A2 may be edges facing each other in a first direction (x-axis direction) perpendicular to the optical axis OA. The first edge A1 and the second edge A2 may have a curved shape. The third edge A3 and the fourth edge A4 may be edges facing each other in a second direction (y-axis direction) perpendicular to the optical axis OA and the first direction. The third edge A3 and the fourth edge A4 may be edges connecting ends of the first edge A1 and the second edge A2. The third edge A3 and the fourth edge A4 may have a straight-line shape. That is, the first to third lenses 210, 220, and 230 may have a D-cut shape.

The first to third lenses 210, 220, and 230 may have the aforementioned non-circular shape during the manufacturing process. For example, when the first to third lenses 210, 220, and 230 include a plastic material, they may be manufactured in a non-circular shape during an injection process. Alternatively, the first to third lenses 210, 220, and 230 may be manufactured in a circular shape through an injection process, and a partial region is cut in a subsequent cutting process to form the third edge A3 and the fourth edge A4. Accordingly, the effective region of each of the first to third lenses 210, 220, and 230 may have a set size. For example, a length CA of a virtual first straight line passing through the optical axis OA and connecting the first edge A1 and the second edge A2 may be longer than the length CH of a virtual second straight line passing through the optical axis OA and connecting the third edge A3 and the fourth edge A4. Here, the length CA of the first straight line may mean a maximum clear aperture CA of each of the first to third lenses 210, 220, and 230, and the length CH of the second straight line may mean a minimum clear height CH of an effective aperture of each of the first to third lenses 210, 220, and 230.

In the above description, it has been described that the effective regions of the first to third lenses 210, 220, and 230 have a non-circular shape, but without being limited thereto, the effective regions of each lens may have a circular shape, and the ineffective regions may have a non-circular shape.

The optical system 1000 according to the second embodiment may satisfy at least one or two or more of equations described below. Accordingly, when the optical system 1000 according to the second embodiment satisfies at least one or two or more of the following equations, it may have improved optical characteristics. In addition, when the optical system 1000 satisfies at least one or two or more of the following equations, it may be implemented smaller and more compact. In addition, when the optical system 1000 satisfies at least one or two or more of the following equations, it may be applied to a folded camera having a smaller thickness, so that a device including the camera may be manufactured with a thin thickness.

$$9 < EFL < 40 \quad \text{[Equation 14]}$$

In Equation 14, EFL means the effective focal length (mm) of the optical system 1000. In detail, the EFL of the optical system 1000 may be 11<EFL<30. In more detail, the EFL of the optical system 1000 may be 13<EFL<26.

$$0.95 < L1S1 / L1S2 < 1 \quad \text{[Equation 15]}$$

In Equation 15, L1S1 means the effective aperture (mm) of the object-side surface (first surface S1) of the first lens 210, and L1S2 means the effective aperture (mm) of the image-side surface (second surface S2) of the first lens 210 (the first surface S1). In detail, L1S1/L1S2 may satisfy 0.96<L1S1/L1S2<1. In detail, L1S1/L1S2 may satisfy 0.99<L1S1/L1S2<1.

$$-8 < R\_L1 / R\_L3 < 0.98 \quad \text{[Equation 16]}$$

In Equation 16, R_L1 means the radius of curvature (mm) of the object-side surface (first surface S1) of the first lens 210, and R_L3 means the radius of curvature (mm) of the object-side surface (third surface S3) of the second lens 220. In detail, R_L1 and R_L3 may satisfy −8<R_L1/R_L3<−2.

$$0.1 < TH\_L1 / TH\_L2 < 0.75 \quad \text{[Equation 17]}$$

In Equation 17, TH_L1 means the center thickness (mm) of the first lens 210, and TH_L2 means the center thickness (mm) of the second lens 220. In detail, TH_L1 and TH_L2 may satisfy 0.2<TH_L1/TH_L2<0.65. In more detail, TH_L1 and TH_L2 may satisfy 0.3<TH_L1/TH_L2<0.55.

$$0.52 < CHn(n < 4) / CAn(n < 4) < 0.98 \quad \text{[Equation 18]}$$

In Equation 18, CHn (n<4) means the minimum clear height (mm) of the effective aperture of the n-th lens. In detail, CHn (n<4) means the minimum size (mm) of an effective aperture of one lens selected from among the first to third lenses 210, 220, and 230. Also, CAn(n<4) means the maximum clear aperture (mm) of the n-th lens. In detail, CAn (n<4) means the maximum size (mm) of the effective aperture of one lens selected from the first to third lenses 210, 220, and 230.

$$20 < |f1| - |f2| < 150 \quad \text{[Equation 19]}$$

In Equation 19, f1 means the focal length (mm) of the first lens 210, and f2 means the focal length (mm) of the second lens 220.

$$2 < BFL / ImgH < 5 \quad \text{[Equation 20]}$$

In Equation 20, BFL (Back focal length) means the distance (mm) in the optical axis direction from the image-side surface of the lens 260 closest to the image sensor 300 among the plurality of lenses to the image sensor 300. In addition, ImgH means a value of ½ of the diagonal length (mm) of the effective region of the image sensor 300. That is, ImgH means a vertical distance (mm) from the optical axis of the upper surface of the image sensor 300 to a region of one field.

$$0.35 < BFL / EFL < 0.75 \quad \text{[Equation 21]}$$

In Equation 21, BFL (Back focal length) means the distance (mm) in the optical axis direction from the image-side surface of the lens 260 closest to the image sensor 300 among the plurality of lenses to the image sensor 300. do. Also, EFL means an effective focal length (mm) of the optical system 1000.

$$1.5 < TTL / BFL < 2.5 \quad \text{[Equation 22]}$$

In Equation 22, TTL (Total track length) means a distance (mm) in the optical axis direction from the object-side surface (first surface S1) of the first lens 210 closest to the object side among the plurality of lenses to the image sensor 300. Also, BFL means a distance (mm) in the optical axis direction from an image-side surface of the lens 260 closest to the image sensor 300 among the plurality of lenses to the image sensor 300.

$$0.75 < DL2 / TTL < 0.9 \quad \text{[Equation 23]}$$

In Equation 23, DL2 means the distance (mm) in the optical axis direction from the object-side surface (third surface S3) of the lens 220 secondly adjacent to the object-side of the plurality of lenses to the image sensor 300. In addition, TTL (Total track length) means the distance (mm) in the optical axis direction from the object-side surface (first surface S1) of the lens 210 closest to the object side among the plurality of lenses to the image sensor 300.

When the optical system 1000 includes 6 lenses as in the second embodiment, the following Equations 24 to 29 may be further satisfied.

$$|f3| < |f2| < |f6| < |f4| < |f5| < |f1| \quad \text{[Equation 24]}$$

Equation 24 is an example of comparing the absolute value of the focal length of each lens. In Equation 24, f1 means the focal length of the first lens 210, and f2 means the focal length of the second lens 220. Also, f3 means the focal length of the third lens 230, and f4 means the focal length of the fourth lens 240. Also, f5 means the focal length of the fifth lens 250, and f6 means the focal length of the sixth lens 260.

$$|f1| > |f2| + |f3| + |f4| + |f5| + |f6| \quad \text{[Equation 25]}$$

In Equation 25, f1 means the focal length of the first lens 110, and f2 means the focal length of the second lens 220. Also, f3 means the focal length of the third lens 230, and f4 means the focal length of the fourth lens 240. Also, f5 means the focal length of the fifth lens 250, and f6 means the focal length of the sixth lens 260.

$$10 < TH\_L1/d12 < 15 \quad \text{[Equation 26]}$$

In Equation 26, TH_L1 means the center thickness (mm) of the first lens 210, and d12 means the distance (mm) between the first lens 210 and the second lens 220 in the direction of the optical axis (OA).

$$0.05 < d12/d23 < 0.08 \quad \text{[Equation 27]}$$

In Equation 27, d12 means the distance (mm) between the first lens 210 and the second lens 220 in the direction of the optical axis OA, and d23 means the distance (mm) between the second lens 220 and the third lens 230 in the direction of the optical axis (OA).

$$8 < f1/EFL < 14 \quad \text{[Equation 28]}$$

In Equation 28, f1 means a focal length (mm) of the first lens 210, and EFL means an effective focal length (mm) of the optical system 1000.

$$Z = \frac{cY^2}{1+\sqrt{1-(1+K)c^2Y^2}} + AY^4 + BY^6 + CY^8 + DY^{10} + EY^{12} + FY^{14} + \ldots \quad \text{[Equation 29]}$$

In Equation 29, Z is Sag and may mean a distance in a direction of the optical axis from an arbitrary position on the aspherical surface to the apex of the aspheric surface. Also, Y may mean a distance in a direction perpendicular to the optical axis from an arbitrary position on the aspherical surface to the optical axis. Also, c may mean the curvature of the lens, and K may mean the conic constant. Also, A, B, C, D, E, and F may mean aspheric constants.

The optical system 1000 according to the second embodiment may satisfy at least one or two or more of Equations 14 to 28. In particular, the optical system 1000 may include at least one lens surface having an effective aperture larger than that of the first surface S1 and may have improved optical characteristics. In the optical system 1000, the first to third lenses 210, 220, and 230 may have a non-circular shape, for example, a D-cut shape. Accordingly, the optical system 1000 may be implemented in a smaller size and may be provided in a compact form compared to a circular shape. When the optical system 1000 satisfies at least one or two or more of Equations 14 to 28, the optical system 1000 may be applicable to a folded camera. In detail, the optical system 1000 may include the light path changing member and change light incident in a direction perpendicular to the surface of the device applied thereto into a direction parallel to the surface of the device. Accordingly, the optical system 1000 including a plurality of lenses may have a thinner thickness within the device, and thus the device may be provided thinner.

TABLE 4

| Lens | Surface | Radius (mm) of curvature | Thickness or distance (mm) | effective aperture (mm) | Refractive index | Abbe number |
|---|---|---|---|---|---|---|
| Lens 1 | S1 | −19.9933 | 0.6000 | 2.55 | 1.6206 | 25.9493 |
| | S2 | −16.7452 | 0.0500 | 2.564992 | | |
| Lens 2 | S3 | 4.3203 | 1.6000 | 2.549184 | 1.5368 | 55.6762 |
| | S4 | −40.7755 | 0.7525 | 2.379602 | | |
| Lens 3 | S5 | −43.2080 | 0.9494 | 2.138226 | 1.6206 | 25.9493 |
| | S6 | 3.2413 | 0.4500 | 1.907641 | | |
| Lens 4 | S7 | 4.9217 | 1.2609 | 1.957455 | 1.6461 | 23.5179 |
| | S8 | 5.7652 | 1.0962 | 1.846404 | | |
| Lens 5 | S9 | 3.9124 | 0.8952 | 1.952156 | 1.5368 | 55.6762 |
| | S10 | 4.0317 | 0.6932 | 1.914924 | | |
| Lens 6 | S11 | 8.9672 | 0.6526 | 1.979515 | 1.6461 | 23.5179 |
| | S12 | 28.9156 | | 2 | | |

TABLE 5

| Item | Second embodiment |
|---|---|
| TTL | 17.3614 |
| EFL | 17.1380 |
| BFL | 8.3614 |
| ImgH | 3.2000 |
| f1 | 155.1162 |
| f2 | 7.3685 |
| f3 | −4.8207 |
| f4 | 32.8128 |
| f5 | 68.0291 |
| f6 | 19.8623 |

Table 4 shows the radius of curvature, the thickness (mm) of the center of each lens, the distance (mm) between the lenses, the size of the effective aperture, refractive index, and Abbe number of the first to sixth lenses 210, 220, 230, 240, 250, and 260 according to the second embodiment. Table 5 relates to a total track length (TTL), an effective focal length (EFL), a back focal length (BFL), and a focal length of a lens of the optical system 1000 according to the second embodiment. Referring to Table 4, the refractive indices of the first lens 210 and the third lens 230, the refractive indices of the second lens 220 and the fifth lens 250, and the refractive indices of the fourth lens 240 and the sixth lenses 260 may be the same as each other. In addition, the refractive index of the second lens 220 may be smaller than the refractive index of the first lens 210, and the refractive index of the first lens 210 may be smaller than the refractive index of the fourth lens 240. Abbe numbers of the first lens 210 and the third lens, Abbe numbers of the second lens 220 and the fifth lens 250, and the Abbe numbers of the fourth lens 240 and the sixth lens 260 may be equal to each other. In addition, the Abbe number of the fourth lens 240 may be smaller than the Abbe number of the first lens 210, and the Abbe number of the first lens 210 may be smaller than the Abbe number of the second lens 220. Each surface S1, S2, S3, S4, S5, S6, S7, S8, S9, S10, S11, and S12 of the first to sixth lenses 210, 220, 230, 240, 250, and 260 may have a set effective aperture (clear aperture). In detail, in the optical system 1000, the size of the effective aperture of the second surface S2 may be larger than the size of the effective aperture of the first surface S1, and the size of the effective aperture of the first surface S1 may be larger than the size of the effective aperture of the third surface S3. Although not disclosed in Table 4, the second lens 220 may include at least one surface having an effective aperture greater than that of the first lens 210. For example, the size of the effective aperture of the third surface S3 may be larger than that of the first surface S1. In addition, the size of the effective aperture of the third surface S3 may be larger than the sizes of the effective apertures of the first surface S1 and the second surface S2.

Referring to Table 5, the effective focal length EFL of the optical system 1000 may be smaller than the focal length f1 of the first lens 210. Also, the effective focal length EFL of the optical system 1000 may be greater than the focal length f2 of the second lens 220.

TABLE 6

| | Equation | Second embodiment |
|---|---|---|
| Equation 14 | $9 < EFL < 40$ | Satisfaction |
| Equation 15 | $0.95 < L1S1/L1S2 < 1$ | 0.9941551 |
| Equation 16 | $-8 < R\_L1/R\_L3 < 0.98$ | −4.627733 |
| Equation 17 | $0.1 < TH\_L1/TH\_L2 < 0.75$ | 0.375 |
| Equation 18 | $0.52 < CH_{n(n<4)}/CA_{n(n<4)} < 0.98$ | Satisfaction |
| Equation 19 | $20 < \lvert f1\rvert - \lvert f2\rvert < 150$ | 147.7477 |
| Equation 20 | $2 < BFL/ImgH < 5$ | 2.61295 |
| Equation 21 | $0.35 < BFL/EFL < 0.75$ | 0.48789 |
| Equation 22 | $1.5 < TTL/BFL < 2.5$ | 2.07637 |
| Equation 23 | $0.75 < DL2/TTL < 0.9$ | 0.870402 |
| Equation 24 | $\lvert f3\rvert < \lvert f2\rvert < \lvert f6\rvert < \lvert f4\rvert < \lvert f5\rvert < \lvert f1\rvert$ | Satisfaction |
| Equation 25 | $\lvert f1\rvert > \lvert f2\rvert + \lvert f3\rvert + \lvert f4\rvert + \lvert f5\rvert + \lvert f6\rvert$ | Satisfaction |
| Equation 26 | $10 < TH\_L1/d12 < 15$ | 12 |
| Equation 27 | $0.05 < d12/d23 < 0.08$ | 0.06645 |
| Equation 28 | $8 < f1/EFL < 14$ | 9.051 |

Table 6 shows result values of the optical system 1000 of the second embodiment for the above-described equations. Referring to Table 6, it may be seen that the optical system 1000 according to the second embodiment satisfies at least one or two or more of Equations 14 to 28. In detail, it may be seen that the optical system 1000 satisfies all of Equations 14 to 28. Accordingly, the optical system 1000 according to the second embodiment may have MTF (Modulation Transfer Function) characteristics and aberration characteristics as shown in FIGS. 9 and 10. In detail, FIG. 10 is a graph of an aberration diagram of the optical system 1000 according to the first embodiment, and is graph in which spherical aberration, astigmatic field curves, and distortion are measured from left to right. In FIG. 10, the X axis may represent a focal length (mm) or distortion (%), and the Y axis may represent the height of an image sensor. In addition, a graph of spherical aberration is a graph of light in a wavelength band of about 435 nm, about 486 nm, about 546 nm, about 587 nm, and about 656 nm, and a graph of astigmatism and distortion is a graph of light in a wavelength band of 546 nm. The optical system 1000 according to the first embodiment may have improved optical characteristics. In detail, the optical system 1000 may include at least one lens surface having a larger effective aperture than the first surface S1 of the first lens 210 and may have improved optical characteristics. In the optical system 1000, the first to third lenses 210, 220, and 230 may have a non-circular shape, for example, a D-cut shape. Accordingly, the optical system 1000 may be implemented in a smaller size and can be provided in a compact form compared to a circular shape. The optical system 1000 may include a plurality of lenses and a light path changing member (not shown). Accordingly, the optical system 1000 may be applied to a folded camera that can have a smaller thickness, and a device including the camera may be manufactured with a smaller thickness.

Features, structures, effects, etc. described in the above embodiments are included in at least one embodiment of the invention, and are not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and modifications should be interpreted as being included in the scope of the invention. In addition, although the embodiment has been described above, it is only an example and does not limit the invention, and those of ordinary skill in the art to which the invention pertains are exemplified above in a range that does not depart from the essential characteristics of the present embodiment. It can be seen that various modifications and applications that have not been made are possible. For example, each component specifically shown in the embodiment can be implemented by modification. And the differences related to these modifications and applications should be construed as being included in the scope of the invention defined in the appended claims.

The invention claimed is:

1. An optical system comprising:

first to fifth lenses sequentially arranged along an optical axis from an object side to an image side, wherein each of the first to fifth lenses includes an object-side surface and an image-side surface, wherein an effective aperture on the image-side surface of the first lens is larger than an effective aperture on the object-side surface of the first lens, wherein a center thickness of the first lens is thinner than a center thickness of the second lens, wherein the object-side surface of the first lens has a negative (−) radius of curvature, wherein the image-side surface of the first lens has a convex shape, wherein the image-side surface of the second lens has a concave shape, wherein the first lens has a positive (+) refractive power, and wherein the object-side surface of the second lens has an effective aperture smaller than the effective aperture of the object-side surface of the first lens.

2. The optical system of claim 1, wherein the second lens has positive (+) refractive power, and wherein the object-side surface of the second lens has a convex shape.

3. The optical system of claim 1, wherein the center thickness of the first lens is smaller than a distance between the first lens and the second lens in a direction of the optical axis.

4. The optical system of claim 3, wherein the center thickness of the second lens is thicker than a center thickness of each of the third lens, the fourth lens, and the fifth lens.

5. The optical system of claim 1, wherein the second lens has a positive (+) refractive power, and wherein a focal length of the first lens is greater than a focal length of the second lens.

6. The optical system of claim 5, wherein an effective focal length (EFL) of the optical system is smaller than the focal length of the first lens and greater than the focal length of the second lens.

7. The optical system of claim 1, wherein the center thickness of the first lens is smaller than a center thickness of the third lens, and thicker than a center thickness of the fourth lens and a center thickness of the fifth lens, wherein the center thickness of the second lens is thicker than the center thickness of the third lens, and wherein the image-side surface of the first lens has the largest effective aperture among the object-side surfaces and the image-side surfaces of the first to fifth lenses.

8. The optical system of claim 7, wherein the third lens has a negative refractive power, wherein the fifth lens has a positive refractive power, and wherein the fifth lens has a meniscus shape convex toward the object side.

9. The optical system of claim 7, wherein a distance from the image-side surface of the fifth lens to an image sensor in a direction of the optical axis is BFL, wherein ½ of a diagonal length of an effective region of the image sensor is ImgH, wherein a distance from the object-side surface of the first lens to the image sensor in a direction of the optical axis is a total track length (TTL), and wherein the optical system satisfies the following Equations:

$$2 < BFL / ImgH < 5$$

$$1.5 < TTL / BFL < 2.5.$$

10. The optical system of claim 1, wherein the third lens has a negative refractive power, wherein the fourth lens has a positive refractive power, and wherein the fifth lens has a positive refractive power.

11. The optical system of claim 1, wherein the fourth lens and the fifth lens have a meniscus shape convex toward the object side.

12. The optical system of claim 1, wherein the third to fifth lenses have a meniscus shape convex toward the object side.

13. The optical system of claim 1, wherein the image-side surface of the first lens has the largest effective aperture among the object-side surfaces and the image-side surfaces of the first to fifth lenses.

14. The optical system of claim 1, wherein a distance from the image-side surface of the fifth lens to an image sensor in a direction of the optical axis is BFL, wherein ½ of a diagonal length of an effective region of the image sensor is ImgH, and wherein the optical system satisfies the following Equation:

$$2 < BFL / ImgH < 5.$$

15. The optical system of claim 1, wherein the center thickness of the first lens is TH_L1, wherein the center thickness of the second lens is TH_L2, and wherein the first and second lenses satisfy the following Equation:

$$0.2 < TH\_L1 / TH\_L2 < 0.65.$$

16. The optical system of claim 1, wherein a distance from the object-side surface of the first lens to an image sensor in a direction of the optical axis is a total track length (TTL), wherein a distance from the image-side surface of the fifth lens to the image sensor in the direction of the optical axis is BFL, and wherein the optical system satisfies the following Equation:

$$1.5 < TTL / BFL < 2.5.$$

* * * * *